UNITED STATES PATENT OFFICE.

WALTER HAMIS GLOVER, OF BRAINTREE, AND LEONARD PHILIP WILSON, OF COVENTRY, ENGLAND, ASSIGNORS, BY MESNE ASSIGNMENTS, TO THE VISCOSE COMPANY, OF MARCUS HOOK, PENNSYLVANIA, A CORPORATION OF PENNSYLVANIA.

MANUFACTURE OF CELLULOSE COMPOUNDS.

1,279,329.     Specification of Letters Patent.     Patented Sept. 17, 1918.

No Drawing. Original application filed January 22, 1915, Serial No. 3,830. Divided and this application filed August 2, 1918. Serial No. 247,951.

*To all whom it may concern:*

Be it known that we, WALTER HAMIS GLOVER, formerly of The Avenue Braintree, in the county of Essex, England, but now of Cornish Road, Flint, in the county of Flint, Wales, and LEONARD PHILIP WILSON, of 8 Chester street, Coventry, in the county of Warwick, England, both subjects of the King of Great Britain, have invented new and useful Improvements in the Manufacture of Cellulose Compounds, of which the following is a specification.

This invention relates to the invention for which we have made application for Patent under date of Jan. 22, 1915, Serial No. 3,830 and is a division thereof.

According to the claims allowed under the said application Serial No. 3,830 alkali cellulose is, in the manufacture of cellulose compounds, subjected to oxidation by supplying thereto an oxidizing agent, the oxidizing agent, other than atmospheric air, which is named in the claims, subsidiary to the main claim, being oxygen gas, either alone, or in admixture with other gas.

We have found that the oxidizing can be very conveniently and efficiently effected by the use of a soluble peroxid such for instance as sodium peroxid, or hydrogen peroxid, or a mixture of such peroxids.

Such peroxid, or peroxids, can be employed in place of any of the other oxidizing agents, mentioned in the specification of our original application as allowed and covered by its claims.

The following is an example of how the present invention can be performed.

Two kilos of sodium peroxid are dissolved in two hundred kilos of a 17½ per cent. solution of caustic soda, and five kilos of wood-pulp, in sheet form, are immersed in the liquid, at a temperature of about 18° centigrade, for from four to five hours. The product is then removed and pressed until it weighs about fifteen kilos after which it may be ground and at once converted into xanthate by the action of carbon bisulfid.

As in the case of the allowed specification of our original application, the present invention is applicable not only to the oxidation of viscose solutions, but benerally to the oxidation of alkali-cellulose as explained in that specification, whether in the manufacture of viscose, or not, and also, as explained in that specification, by varying the time, or the temperature, of treatment, or the quantity of the peroxid, or peroxids, employed, products of different degrees of oxidation, and viscose solutions of various degrees of viscosity, and other qualities, can be obtained and, although the invention is eminently useful in the manufacture of artificial silk, the products can be used for any purpose for which they are applicable.

In the following claims it is to be understood that the term "a soluble peroxid" includes also any mixture of such peroxids.

What we claim is:—

1. In the manufacture of cellulose compounds, subjecting alkali-cellulose to oxidation by means of a soluble peroxid.

2. In the manufacture of cellulose compounds, subjecting alkali-cellulose to oxidation by means of sodium peroxid.

3. In the manufacture of alkali-cellulose, treating wood-pulp with caustic soda solution of sufficient strength to form alkali cellulose and a soluble peroxid.

4. In the manufacture of alkali-cellulose, treating wood-pulp with caustic soda solution of sufficient strength to form alkali cellulose and sodium peroxid.

5. The manufacture of viscose which consists in treating alkali-cellulose with a soluble peroxid and converting the product into cellulose xanthate.

6. The manufacture of viscose which consists in treating alkali-cellulose with sodium peroxid and converting the product into cellulose xanthate.

In testimony whereof we have signed our names to this specification in the presence of two subscribing witnesses.

WALTER HAMIS GLOVER.
LEONARD PHILIP WILSON.

Witnesses to the signature of Walter Hamis Glover:
   WILLIAM EDWARD HUGHES,
   JAMES ARTHUR JULNES.

Witnesses to the signature of Leonard Philip Wilson:
   ALBERT BROWN,
   ANNIE L. WADE.